United States Patent [19]

Lovald

[11] Patent Number: 4,661,194

[45] Date of Patent: Apr. 28, 1987

[54] FABRIC BONDING POLYAMIDE RESINS WITH LOWERED FUSION POINT

[75] Inventor: Roger A. Lovald, Roseville, Minn.

[73] Assignee: Henkel Corporation, Minneapolis, Minn.

[21] Appl. No.: 799,766

[22] Filed: Nov. 19, 1985

[51] Int. Cl.$^4$ .............................................. C09J 3/14
[52] U.S. Cl. .................................. 156/330.9; 428/248; 528/324; 528/338; 528/339.3; 528/339.5
[58] Field of Search ..................... 156/330.9; 428/248; 528/324, 338, 339.3, 339.5

[56] References Cited

U.S. PATENT DOCUMENTS

| | | | |
|---|---|---|---|
| 3,444,026 | 5/1969 | Peerman | 528/339.3 |
| 3,867,248 | 2/1975 | Bauer | 428/248 |
| 4,196,108 | 4/1980 | Hinze et al. | 528/324 |
| 4,566,931 | 1/1986 | Panoch et al. | 528/324 |

FOREIGN PATENT DOCUMENTS 57-75849  5/1982  Japan .................................... 528/324

*Primary Examiner*—John J. Gallagher
*Attorney, Agent, or Firm*—Ernest G. Szoke; Patrick J. Span

[57] ABSTRACT

Polyamide adhesives for bonding fabrics which allow for a lower bonding temperature than had been possible with similar previously available polyamide fabric bonding resins. The polyamide adhesives of the present invention are particularly suitable for use as fusible interliners for fabrics which demonstrate excellent retention of adhesive properties even after repeated cleaning by laundering and/or dry cleaning. The polyamide adhesive is an amidification product of (a) caprolactam,
(b) a diamine component which is 50–75 eq. % hexamethylene diamine, and 25–50 eq. % piperazine, or 2-methyl pentamethylene diamine, and
(c) a mixture of a polymeric fat acid and an aliphatic straight chain co-dicarboxylic acid having 6–12 carbon atoms.

15 Claims, No Drawings

FABRIC BONDING POLYAMIDE RESINS WITH LOWERED FUSION POINT

BACKGROUND OF THE INVENTION

1. Field of the Invention

This invention relates to polyamide adhesives for bonding fabrics which allow for a lower bonding temperature than had been possible with similar previously available polyamide fabric bonding resins. The polyamide adhesives of the present invention are particularly suitable for use as fusible interliners for fabrics which demonstrate excellent retention of adhesive properties even after repeated cleaning by laundering and/or dry cleaning. The polyamide adhesive is an amidification product of (a) a caprolactam polymer,
(b) a diamine component which is 50-75 eq. % hexamethylene diamine, and 25-50 eq. % piperazine, or 2-methyl pentamethylene diamine, and
(c) a mixture of a polymeric fat acid and an aliphatic straight chain co-dicarboxylic acid having 6-12 carbon atoms.

2. Statement of the Related Art

Many attempts to use various polymers in fabric bonding have been found deficient in one or more regards, such as insufficient bonding, little resistance to dry cleaning or laundering, unacceptably high temperature required for fabric bonding, and hand feel (too inflexible to provide desirable drape and softness when used in garment or drapery manufacture). Recently, U.S. Pat. No. 4,217,256 attempted to provide a satisfactory hot melt adhesive for bonding fusible interliners with fabrics. The polyamide adhesives therein disclosed are polymeric fat acid terpolyamides having a melt index at 175° C. of at least 30 and a melt viscosity of not more than 125 poise at 220° C. wherein the properties are controlled within certain ranges. Those terpolyamides are thermal amidification products prepared at 100°-300° C. for a time sufficient to affect amidification of a caprolactam polymer, the polyamide of hexamethylene diamine and a polymeric fat acid and the polyamide of hexamethylene diamine and a co-dicarboxylic acid having 10-12 carbon atoms. Although the resins described in U.S. Pat. No. 4,217,256 are found to be useful in a variety of applications, there are certain heat sensitive synthetic fabrics which require substantially lower fusion points than can be achieved with these previously available resins.

U.S. Pat. No. 4,045,389 attempted to provide a satisfactory melt adhesive to overcome the deficiency in cleanability of textiles bonded with polyamide adhesive having certain melt viscosities within a relatively narrow range of 25-600 Pas measured at 200° C. obtained by using certain amounts of monocarboxylic acids as viscosity regulators. These polyamides were reaction products of caprolactam, various diamines and a mixture of dimerized fatty acids and other co-dicarboxylic acids. With the use of these polyamide adhesives, it is not possible to achieve the lowered fusion points possible with the adhesives of the present invention.

U.S. Pat. No. 4,396,759 discloses polyamide fabric bonding resins having a melt viscosity, measured at 220° C. of 5-150 Pas. and being the reaction product of approximately equivalent amounts of an acid component and a basic component, the acid component comprising (a)
 (1) a dimerized fatty acid, and optionally
 (2) a monocarboxylic acid;
(b) at least one aliphatic straight chain co-dicarboxylic acid,
said basic component comprising
(c) an aliphatic straight-chain diprimary diamine and
(d) caprolactam.

These products are said to evidence very good initial resistance to tear, very high wet strengths, and outstanding values of tear resistance after repeated laundering cycles. These polyamide resins, however, do not evidence the lowered fusion points which have been achieved with the polyamide fabric bonding resins of the present invention.

U.S. Pat. No. 4,150,002 is concerned with polyamides and polyesteramides having melt viscosities from 25 to 600 Pas. at 220° C., which are useful as melt adhesives for textiles. These materials are condensation products formed between (a) a dimerized fatty acid component containing at least 70% of dimeric acid; and (b) a 6-13 carbon atoms aliphatic straight chain co-dicarboxylic acid; (c) a 6-12 carbon atoms aliphatic straight-chain diprimary diamine; and (d) caprolactam and/or -aminocaproic acid; the polyesteramides additionally containing a further component (e) which is caprolactone and/or -hydroxycaproic acid. However, these hot melt fabric adhesives similarly lack the lowered fusion points achievable with polyamide fabric bonding resins of the present invention.

SUMMARY OF THE INVENTION

The polyamide adhesive fabric bonding resins described in U.S Pat. No. 4,217,256 demonstrate excellent retention of fabric bonding strengths even after subjection to repeated laundering and dry cleaning cycles. These terpolyamide fabric adhesives are suitable for bonding fabrics through the use of steam or electrically heated presses. Where the fabric bonding resins of U.S. Pat. No. 4,217,256 are not suitable is in the bonding of certain heat sensitive synthetic fabrics which require substantially lower fusion points.

It has now unexpectedly been found that upon substitution of 25-50 eq % of the hexamethylene diamine employed in the resins disclosed in U.S. Pat. No. 4,217,256, with a diamine selected from aliphatic branched chain diprimary diamines of 6 to 12 carbon atoms, such as 2-methyl pentamethylene diamine and saturated heterocyclic disecondary diamines having heterocyclic ring members consisting of two secondary amine nitrogen atoms and 4 carbon atoms, such as piperazine, the resulting polyamides demonstrated a significant increase in original bond strength along with substantially lower fusion temperatures, i.e. fusion temperatures approximately 10°-15° C. below those obtained with the polyamides of U.S. Pat. No. 4,217,256. Within these ranges, it was noted that at the lower level of 25 eq. % of aliphatic branched chain diprimary diamines or saturated heterocyclic disecondary diamines, the resultant polyamide evidenced excellent bond strength retention after laundering and dry cleaning. At the higher level of 50 eq. % of aliphatic branched chain diprimary diamines or saturated heterocycylic disecondary diamines, the novel polyamide resins exhibited the valuable significantly lowered fusion point (approximately 10°-15° C. lower than possible with the polyamide resins of U.S. Pat. No. 4,217,256), and outstanding resistance to dry cleaning, although resistance to laundering is not as significant.

Thus, the polyamides of the present invention are thermal amidification products prepared at 100°–300° C. for a time sufficient to effect amidification of
(a) caprolactam, amino-caproic acid or mixtures
(b) a diamine component which is
  (1) 50–75 eq. % hexamethylene diamine,
  (2) 25–50 eq. % piperazine, or 2-methyl pentamethylene diamine,
(c) a mixture of polymeric fat acid and an aliphatic straight chain co-dicarboxylic acid having 6–12 carbon atoms.

These novel polymeric fat acid polyamides have a melt viscosity of not more than 600 p at 190° C. These polyamides evidence fusion points which are approximately 10°–15° C. lower than possible with the similar polyamides of U.S. Pat. No. 4,217,256. These polyamides employ substantially equivalent amounts of carboxyl and total amine and in which the caprolactam polymer constitutes 25–30 % by weight of the total polymer, the polyamide of the polymeric fat acid and the total amine constitutes generally 45–65 and preferably 45–55% by weight and the polyamide of the codicarboxylic acid and the total amine constitutes generally 10–25 and preferably 20–25% by weight, particularly where the longer chain dicarboxylic acids are employed.

The present invention is also directed to the method of adhering a fusible interliner to a fabric using the polyamide adhesive. This is carried out by applying the adhesive polyamide by hot-melt gravure printing to non-woven fabric. The applications in which the present novel polyamide adhesives are particularly advantageous are in the bonding of heat sensitive synthetic fabrics.

DETAILED DESCRIPTION AND PREFERRED EMBODIMENT

For successful bonding of fusible interliners to heat sensitive fabrics, it is desirable that the adhesive bond securely at lower temperatures than have been possible with other fabric bonding adhesive polyamides, since many heat sensitive synthetic fabrics are not stable to pressing at higher temperatures. The adhesive polyamides of the present invention display excellent fabric bonding at the temperatures which are easily achievable with steam presses. Higher temperatures may also be used with the adhesives of the present invention where the heat-sensitivity of the fabric is not of such consideration. Thus, with steam presses, temperatures of 118° C. can be reached. Bonding temperatures need not be limited to the lower range, however, because electrically heated presses are available which can easily go to higher temperatures. In view thereof, the bonding tests used in the specific examples of this invention were run at 118° C. and 127° C.

Another requisite for polymers to be used in fusible interliners is that they be able to resist the damaging effects of hot water laundering and for cleaning in common dry cleaning solvents, such as trichloroethylene and perchloroethylene. After bonding at the two temperatures mentioned, four specimens at each bonding temperature are pulled in 180° peel. These are called the "control" group. Other specimens are subjected to five cycles of laundering in aqueous "Tide" solution at 60° C. while others are dry cleaned five cycles with vigorous shaking in trichloroethylene. After these cleaning processses, four samples of each are tested for peel strength. In the tests conducted herein any samples which separate spontaneously during cleaning are designated with an F. Those remaining intact after five cycles of laundering or dry cleaning but having average peel values of less than 1 lb./2 in. are of questionable strength. Bonds having average values of greater than 1 lb./2 in. are considered to have successfully passed the bond strength test.

As previously mentioned, the polyamides of this invention are prepared by amidification at temperatures of about 100°–300° C. for a time sufficient to effect amidification of
(a) caprolactam, amino-caproic acid or mixtures thereof,
(b) a diamine component which is 50–75% hexamethylene diamine and 25–50% piperazine, or 2-methyl pentamethylene diamine, and
(c) a mixture of a polymeric fat acid and an aliphatic straight chain co-dicarboxylic acid having 6–12 carbon atoms.

Epsilon-caprolactam is preferred; however, the corresponding amino-acid and mixtures thereof with the lactam may be employed. The co-dicarboxylic acids are those such as sebacic acid, dodecanedioic acid and adipic acid.

The polymeric fat acids from which the polyamides of the present invention are derived, are all well known and easily available commercially. A recitation of suitable polymeric fat acids and a method of preparing them are disclosed in U.S. Pat. No. 3,157,681.

Typical compositions of commercially available undistilled polymeric fat acids derived from tall oils and other ethylenically unsaturated monocarboxylic acids are given in U.S. Pat. No. 4,217,256.

The relative ratios of monomer, dimer and trimer in such fractionated polymeric fat acids are dependent on the nature of the starting material and the conditions of polymerization . For the purposes of this invention, the term "monomeric fat acids" refers to the unpolymerized monomeric acids, the term "dimeric fat acids" refers to the dimer of the fat acids and the term "trimeric fat acids" refers to the residual higher polymeric forms consisting primarily of trimer acids but containing some higher polymeric forms. The term "polymeric fat acids" as used herein is intended to be generic to polymerized acids obtained from the ethylenically unsaturated fat acids and consists of a mixture of dimeric and trimeric fat acids.

The polymeric fat acids suitable for use in preparing the polyamide bonding resins of the present invention are those recited in U.S. Pat. No. 4,217,256. Also disclosed in U.S. Pat. No. 4,217,256 are methods for polymerizing ethylenically unsaturated acids according to known catalytic and non-catalytic polymerization techniques. Further, U.S. Pat. No. 4,217,256 teaches methods well known in the art for determining the amount of monomeric fat acids (often referred to as monomer), dimeric fat acids (often referred to as dimer), and trimeric or higher polymeric fat acids (often referred to as trimer).

The polymeric fat acid employed to prepare the starting polyamides has a dimeric fat acid content, determined by gas-liquid chromatography of a least about 85% by weight (preferably greater than 90%). Where the initially polymerized fat acids have dimer contents below the above period, they are distilled to yield fractions having the requisite dimer content.

It is preferred that the polymeric fat acids are hydrogenated in order to improve the color therof. The hydrogenation is accomplished according to the procedure recited in U.S. Pat. No. 4,217,256.

In the Examples which follow, the polymeric fat acids were those obtained by polymerizing, distilling and hydrogenating the mixture of fat acids derived from tall oil (composed of approximately 40-45% by weight linoleic and 50-55% by weight oleic).

The polyamides should have a melt viscosity measured at 190° C. of not more than 600 poises. Preferably, the melt viscosity is in the range of about 100-500 poises. The procedures for determining melt index and melt viscosities are well known in the art and are disclosed in detail in U.S. Pat. No. 4,217,256.

The relationship of the monomeric acids to the dimeric acids is expressed by a value referred to as the Kv value. It is calculated by the equation $Kv = M + I/4 - T/3$ in which M=monomer content of the dimer, I=intermediate content, and T=trimer acid content, all expressed in percent by weight of total dimer composition. For the purposes of defining the viscosity limits of this invention M is defined as the total amount of monomeric acids used to reduce viscosity. Further discussion of the determination of the Kv values of the polyamides is given in detail in U.S. Pat. No. 4,217,256.

In the preparation of the polyamides of the present invention, the reactants are all charged to the reactor at the same time. The polyamide is referred to, however, in the usual conventional sense as though each polymer were formed individually and the percent by weight of each individual polymer is referred to in the total. Thus, the polyamide is referred to and defined by the weight percent content of the condensation of their individual starting reactants.

EXAMPLE I

RESIN PREPARATION

All the reactants were charged to a steel reactor kettle which was flushed with nitrogen three times and sealed. Agitation was begun and the reactor heated to 170°-180° C. and a pressure of 90-120 psi and held for 1.5 hours. The reactor was vented to remove condensate and reduce pressure over a one hour period, applying heat at the start of venting and controlling venting to prevent cooling below 160° C. The reactor is then heated at a rate to attain 250° C. and 0 psi at approximately the same time and a temperature of 250°-260° C. with nitrogen purge maintained for 30 minutes. Vacuum (about 8 mm Hg pressure) is then applied for 2.5 hours at 250° C. The product is then cooled slightly and discharged from the reactor.

EXAMPLE II

RESIN EVALUATION

A. In order to form a deposit of polyamide for subsequent bonding, the adhesives were applied by hot melt gravure printing to non-woven fabric at levels between 14-21 g/m².

B. To provide samples for evaluation as a control, after laundering and after dry cleaning, the non-woven fabric is bonded to a cotton broadcloth by bonding in a Wabash press at 5 psi for 8 seconds at temperatures of 118° and 127° C. Areas of 8¼ inches by 8 inches are bonded with 1 inch at the top and bottom unbonded to provide unbonded areas to be held by the jaws of an Instron tester. Each specimen is cut into 2 inch by 4 inch pieces with a bonded area of 2 inches by 3 inches.

C. The bonded samples are then compared for bond strength on a control, after laundering and after dry cleaning using the following procedure:
(1) Aging at least overnight at 72° F. and 50% Relative Humidity
(2) Dry Cleaning—5 cycles
  (a) Samples are placed in a 1 gallon jar, one-half full of trichloroethylene and placed on a shaker for 2 minutes. After each cycle, the sample is air dried.
(3) Laundry - 5 cycles (14.7 gallons H₂O, 53.4 grams "Tide.")
  (a) The samples are washed at 140° F. with a normal wash of 14 minutes spray and agitation rinse at 100° F. The total time is 30 minutes. The samples are then dried in 140° F. air oven for 20-25 minutes.
(4) The samples are then tested in an Instron tester one day after laundering and dry cleaning using the conditions below and recording the peel value in pounds (lb) per 2 inches.
  (a) Conditions: 5 lb. full scale load, 12" crosshead speed, 5" crosshead distance, 2 inches per minute chart speed. If necessary, a switch to the 10 lb. scale load may be used.

EXAMPLE III

A series of polyamides were prepared in accordance with Example I and are described below in Table I.

TABLE I

| | RESIN REACTANTS (GRAMS) | | | | | | | | | | | |
|---|---|---|---|---|---|---|---|---|---|---|---|---|
| Resin | A | B | C | D | E | F | G | H | I | J | K | Comparative All HMDA |
| HDD[a] | 300 | 267 | 286 | 300 | 299 | 302 | 286 | 286 | 300 | 421 | 300 | 267 |
| Stearic Acid | 26 | 18 | 40 | 26 | 26 | 26 | 40 | 40 | 26 | 18 | 26 | 18 |
| Dodecanedioic Acid | 122.0 | 107.0 | 122.0 | 122.0 | 122.0 | 126.0 | 122.0 | 122.0 | 122.0 | 15[b] | 122.0 | 107.0 |
| 70% Hexamethylene Diamine | 164.0 | 117.0 | 91.0 | 164.0 | 137.3 | 93.5 | 128.0 | 110.0 | 131.0 | 104.0 | 113.0 | 163.0 |
| 2-Methyl pentamethylene diamine | 13 | 29 | 65 | — | — | — | 39 | 52 | — | — | — | — |
| Piperazine | — | — | — | 10.0 | 24.1 | 49.3 | — | — | 30 | 24 | 40 | — |
| Caprolactam | 178.0 | 156.0 | 178.0 | 178.0 | 178. | 176.0 | 178.0 | 178.0 | 178.0 | 173.0 | 178.0 | 156.0 |

[a]HDD = hydrogenated and distilled polymeric fat acids which are substantially dimeric (greater than 90%).
[b]Adipic, instead of dodecanedioic Table II below described various of the physical properties determined for the polyamides prepared according to Example I and recited in Table I.

TABLE II

| Resin | A | B | C | D | E | F | G | H | I | J | K | Comparative All HMDA |
|---|---|---|---|---|---|---|---|---|---|---|---|---|
| B & R Softening Point, °C. | 133 | 125 | 114 | 130 | 125 | 114 | 117 | 114 | 116 | 128 | 112 | 137 |
| Thermosel Viscosity, 190° C. Poise | 435 | 515 | 115 | 440 | 315 | 210 | 123 | 134 | 250 | 295 | 240 | 535 |
| Acid Number | 1.4 | 0.1 | 0.6 | 2.3 | 2.2 | 3.9 | 0.8 | 0.7 | 0.6 | 1.6 | 1.5 | 0.7 |
| Amine Number | 0.9 | 2.5 | 2.5 | 0.6 | 1.0 | 0.8 | 1.0 | 1.4 | 3.4 | 2.2 | 2.0 | 5.3 |
| Fusion Temp., °C. | | | | | | | | | | | | |
| 1 day | 83 | 80 | 72 | 82 | 76 | 70 | — | — | — | — | — | 82 |
| 7 days | 87 | 85 | 71 | 88 | 84 | 70 | 69 | 66 | 73 | 79 | 72 | 87 |
| Tensile Properties | | | | | | | | | | | | |
| Yield Point | 300 | 180 | 85 | 950 | 700 | 55 | 750 | 225 | 750 | 440 | 625 | 980 |
| Ultimate Strength | 1400 | 2020 | 725 | 2900 | 1950 | 140 | 1000 | 250 | 1600 | 1325 | 1100 | 1925 |
| % Elongation | 500 | 725 | 640 | 525 | 530 | 950 | 425 | 400 | 475 | 600 | 460 | 430 |

EXAMPLE IV

Following the procedures described in Example II above, bonded samples of the present polyamides were prepared and tested.

TABLE III

Adhesion Results

| Resin | Bond Temp. °C. | Original | Peel (lb/2 in) After 5 Cycles Laundry | After 5 Cycles Dry Cleaning |
|---|---|---|---|---|
| B | 118 | 6.1 | 4.5 | 4.6 |
|   | 127 | 6.4 | 3.9 | 3.6 |
| C | 118 | 6.4 | F | 5.2 |
|   | 127 | 7.5 | F | 5.1 |
| E | 118 | 7.3 | 4.9 | 4.6 |
|   | 127 | 7.9 | 6.9 | 5.8 |
| F | 118 | 7.2 | F | 4.9 |
|   | 127 | 7.5 | F | 5.0 |
| G | 118 | 5.0 | 4.8 | 3.6 |
| H | 118 | 5.5 | 3.4 | 4.0 |
| I | 118 | 5.5 | 4.0 | 4.5 |
| J | 118 | 5.5 | F | 3.5 |
| K | 118 | 4.8 | F | 3.2 |
| Comparative | 118 | 3.3 | 1.6 | 1.5 |
|   | 127 | 4.7 | 2.4 | 2.2 |

Having described the present invention, the embodiments thereof in which an exclusive privilege is claimed are described by the following claims.

1. A polyamide adhesive adapted for bonding of fusible interliners for fabrics which are cleanable comprising a polymeric fat acid polyamide having a melt viscosity of not more than 600 poises at 190° C. and being the thermal amidification product product at a temperature of about 100°–300° C. for a time sufficient to effect amidification of
    (a) caprolactam, amino-caproic acid or mixtures thereof,
    (b) a diamine component which is
        (1) 50–75 eq. % hexamethylene diamine, and
        (2) 25–50 eq. % 2-methyl pentamethylene diamine, and
    (c) a mixture of a polymeric fat acid and an aliphatic straight chain co-dicarboxylic acid having 6–12 carbon atoms wherein substantially equal amounts of amine and carboxyl are employed to provide a polyamide product wherein the caprolactam is present in an amount of 25–30% by weight, the polyamide of said diamine component and said polymeric fat acid is present in an amount of 45–65% by weight and the polyamide of said diamine component and said co-dicarboxylic acid is present in an amount of 10–25% by weight of the polyamide.

2. The polyamide adhesive as defined in claim 1 wherein said melt viscosity is in the range of about 100–500 poise.

3. A polyamide adhesive as defined in claim 2 wherein said polyamide is prepared from a polymeric fat acid containing monomeric monocarboxylic acid in an amount to provide a Kv value in the range of 6–14.

4. A polyamide adhesive as defined in claim 3 wherein said polymeric fat acid after addition of any of said monocarboxylic acid to adjust said Kv value within said range contains at least about 80% dimeric fat acid by weight.

5. A polyamide adhesive as defined in claim 2 wherein said polymeric fat acid is obtained by polymerization of 16–22 carbon atom ethylenically unsaturated monocarboxylic acids.

6. A polyamide adhesive as defined in claim 2 wherein said polymeric fat acid is obtained by polymerization of 18 carbon atom ethylenically unsaturated monocarboxylic acids.

7. A polyamide adhesive as defined in claim 6 wherein said 18 carbon atom acids are the mixture of acids obtained from tall oil.

8. A polyamide adhesive as defined in claim 7 wherein said polymeric fat acids obtained from said tall oil are hydrogenated and distilled to provide a polymeric fat acid having a dimeric fat acid content greater than 90% by weight.

9. A polyamide as defined in claim 1 wherein said codicarboxylic acid is dodecanedioic acid.

10. A polyamide adhesive as defined in claim 1 wherein said co-dicarboxylic acid is adipic acid.

11. In a method of adhering a fusible non-woven interliner to a fabric with a polyamide adhesive, the improvement wherein said adhesive is the polyamide as defined in claim 1.

12. A method as defined in claim 11 wherein said interliner is bonded to a woven fabric wherein said polyamide adhesive has been applied by hot melt gravure printing to non-woven fabric.

13. A method as defined in claim 11 wherein said woven fabric is cotton broadcloth.

14. A method as defined in claim 12 wherein said fabric is a synthetic fabric.

15. A method as defined in claim 12 wherein said interliner is bonded to said fabric by the application of heat in a bonding temperature of not less than 118° C.

* * * * *